United States Patent
Zhang et al.

(10) Patent No.: US 9,760,711 B1
(45) Date of Patent: *Sep. 12, 2017

(54) DETECTION OF REPACKAGED MOBILE APPLICATIONS

(71) Applicant: Trend Micro Incorporated, Tokyo (JP)

(72) Inventors: Zhibo Zhang, Nanjing (CN); Liang Sun, Nanjing (CN); Chengkai Tao, Nanjing (CN); Kun Ma, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 33 days.

This patent is subject to a terminal disclaimer.

(21) Appl. No.: 15/064,068

(22) Filed: Mar. 8, 2016

Related U.S. Application Data

(63) Continuation of application No. 14/475,919, filed on Sep. 3, 2014, now Pat. No. 9,313,219.

(51) Int. Cl.
  *G06F 21/00* (2013.01)
  *G06F 21/52* (2013.01)
(52) U.S. Cl.
  CPC .................................. *G06F 21/52* (2013.01)
(58) Field of Classification Search
  CPC ..................................................... G06F 21/52
  See application file for complete search history.

(56) References Cited

U.S. PATENT DOCUMENTS

| | | | | |
|---|---|---|---|---|
| 8,756,432 B1* | 6/2014 | Chen | ...................... | G06F 21/51 |
| | | | | 713/187 |
| 8,806,641 B1* | 8/2014 | Li | .......................... | G06F 21/564 |
| | | | | 717/174 |
| 9,092,615 B1* | 7/2015 | Mao | ......................... | G06F 21/51 |
| 2004/0261021 A1* | 12/2004 | Mittal | .................... | G06F 3/0237 |
| | | | | 715/256 |
| 2006/0241933 A1* | 10/2006 | Franz | .................... | G06F 17/276 |
| | | | | 704/2 |
| 2007/0135111 A1* | 6/2007 | Floyd | ...................... | H04L 63/12 |
| | | | | 455/418 |
| 2008/0274716 A1* | 11/2008 | Fok | ........................ | H04W 12/08 |
| | | | | 455/410 |
| 2010/0146504 A1* | 6/2010 | Tang | .................... | G06F 9/45537 |
| | | | | 718/1 |
| 2011/0047594 A1* | 2/2011 | Mahaffey | .............. | G06F 21/564 |
| | | | | 726/1 |
| 2011/0047597 A1* | 2/2011 | Mahaffey | .............. | G06F 21/564 |
| | | | | 726/3 |

(Continued)

*Primary Examiner* — Ali Shayanfar
(74) *Attorney, Agent, or Firm* — Okamoto & Benedicto LLP

(57) ABSTRACT

A repackaged mobile app that has been unpacked and repackaged back is detected based on similarity of app labels of a target mobile app being evaluated and a reference mobile app. The similarity of the sound of the app label of the target mobile app to the sound of the app label of the reference mobile app may be determined. The similarity of the appearance of the app label of the target mobile app to the appearance of the app label of the reference mobile app may also be determined. The target mobile app may be deemed to be a repackaged mobile app when the app labels of the target and reference mobile apps are deemed to be similar (which may include being the same) but the target and reference mobile apps have different identifiers.

3 Claims, 6 Drawing Sheets

(56) References Cited

U.S. PATENT DOCUMENTS

| | | | |
|---|---|---|---|
| 2011/0145920 A1* | 6/2011 | Mahaffey | G06F 21/564 726/22 |
| 2012/0240236 A1* | 9/2012 | Wyatt | G06F 21/564 726/25 |
| 2013/0132854 A1* | 5/2013 | Raleigh | G06F 3/0482 715/738 |
| 2013/0227683 A1* | 8/2013 | Bettini | G06F 21/57 726/22 |
| 2013/0283377 A1* | 10/2013 | Das | G06F 21/51 726/23 |
| 2013/0291123 A1* | 10/2013 | Rajkumar | G06F 21/00 726/28 |
| 2013/0307784 A1* | 11/2013 | Matsuzawa | G06F 3/0237 345/169 |
| 2013/0347094 A1* | 12/2013 | Bettini | H04L 63/0245 726/11 |
| 2014/0006032 A1* | 1/2014 | Korn | G10L 13/00 704/260 |
| 2014/0047413 A1* | 2/2014 | Sheive | H04L 65/403 717/110 |
| 2014/0082732 A1* | 3/2014 | Britton | G06F 21/56 726/24 |
| 2014/0113683 A1* | 4/2014 | Hickey | G06K 9/00 455/556.1 |
| 2014/0214610 A1* | 7/2014 | Moshir | G06Q 20/4016 705/26.35 |
| 2014/0245448 A1* | 8/2014 | Moon | G06F 21/57 726/25 |
| 2014/0248929 A1* | 9/2014 | Noonan | H04L 9/001 463/9 |
| 2015/0081295 A1* | 3/2015 | Yun | G10L 17/005 704/236 |
| 2015/0121522 A1* | 4/2015 | Guido | H04L 63/145 726/23 |
| 2015/0220514 A1* | 8/2015 | Zhang | G06F 17/289 704/2 |
| 2015/0229673 A1* | 8/2015 | Lee | G06F 21/56 726/1 |

* cited by examiner

290 ~ Plants vs. Zombies
Plants vs. zombies
Plants vs Zombies
Plants Vs. Zombies
Plants vs. Zombie
Plants vs Zombie
Plants.vs.Zombies

DETECTION OF REPACKAGED MOBILE APPLICATIONS

CROSS-REFERENCE TO RELATED APPLICATION

This application is a continuation of U.S. application Ser. No. 14/475,919, filed on Sep. 3, 2014, now U.S. Pat. No. 9,313,219, which is incorporated herein by reference in its entirety.

BACKGROUND OF THE INVENTION

1. Field of the Invention

The present invention relates generally to computer security, and more particularly but not exclusively to methods and apparatus for detecting mobile application programs that have been repackaged.

2. Description of the Background Art

Mobile computing devices run mobile operating systems, which are designed to be suitable for computers that are constrained in terms of memory and processor speed. An application program for a mobile operating system is commonly referred to as a "mobile app" or simply as an "app." A mobile app may be purchased from a mobile app marketplace, which is typically maintained and operated by the vendor of the mobile operating system. Mobile apps may also be purchased from a third-party mobile app marketplace. To purchase a mobile app, a user of a mobile computing device selects a mobile app from a mobile app marketplace, makes an online payment for the mobile app, and then downloads the mobile app onto his mobile computing device. Some mobile apps may also be purchased at no cost.

The ANDROID operating system is an example of a mobile operating system employed in mobile computing devices. Mobile apps for the ANDROID operating system come in a file referred to as the ANDROID application package (APK) file. The APK file is an archive file containing a plurality of files that are needed to run the mobile app, including a file of program code that are executed by the Dalvik process virtual machine of the ANDROID operating system. One problem with an APK file is that it can be unpacked to its constituent files and then repackaged to include additional or modified files. These additional or modified files may comprise malicious code. That is, an authentic ANDROID mobile app may be altered for malicious purposes by repackaging.

SUMMARY

In one embodiment, a repackaged mobile app that has been unpacked and repackaged back is detected based on similarity of app labels of a target mobile app being evaluated and a reference mobile app. The similarity of the sound of the app label of the target mobile app to the sound of the app label of the reference mobile app may be determined. The similarity of the appearance of the app label of the target mobile app to the appearance of the app label of the reference mobile app may also be determined. The target mobile app may be deemed to be a repackaged mobile app when the app labels of the target and reference mobile apps are deemed to be similar (which may include being the same) but the target and reference mobile apps have different identifiers.

These and other features of the present invention will be readily apparent to persons of ordinary skill in the art upon reading the entirety of this disclosure, which includes the accompanying drawings and claims.

DESCRIPTION OF THE DRAWINGS

FIGS. 5-7 show example ways of how an app label of a repackaged mobile app may be varied but remain similar to an app label of an authentic mobile app.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
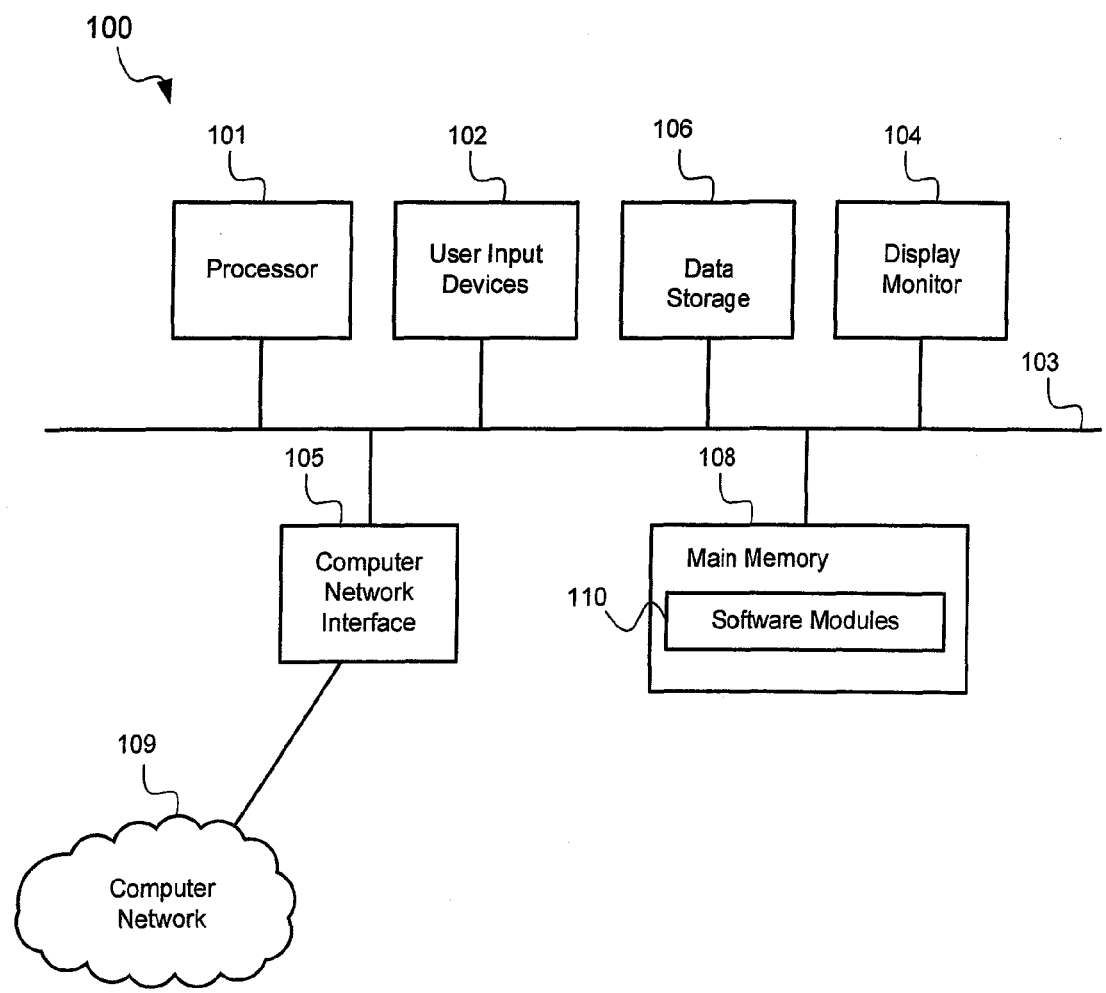
FIG. 1 shows a schematic diagram of a computer that may be employed with embodiments of the present invention.

Referring now to FIG. 1, there is shown a schematic diagram of a computer 100 that may be employed with embodiments of the present invention. The computer 100 may be employed as a computer system for detecting repackaged mobile apps, and other computers described below. The computer 100 may have fewer or more components to meet the needs of a particular application. The computer 100 may include one or more processors 101. The computer 100 may have one or more buses 103 coupling its various components. The computer 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. As an example, the software modules 110 may comprise a repackaged mobile app detector. The computer 100 may be configured to perform its functions by executing the software modules 110. The software modules 110 may be loaded from the data storage device 106 to the main memory 108. An article of manufacture may be embodied as computer-readable storage medium including instructions that when executed by the computer 100 causes the computer 100 to be operable to perform the functions of the software modules 110.

Figure 2:
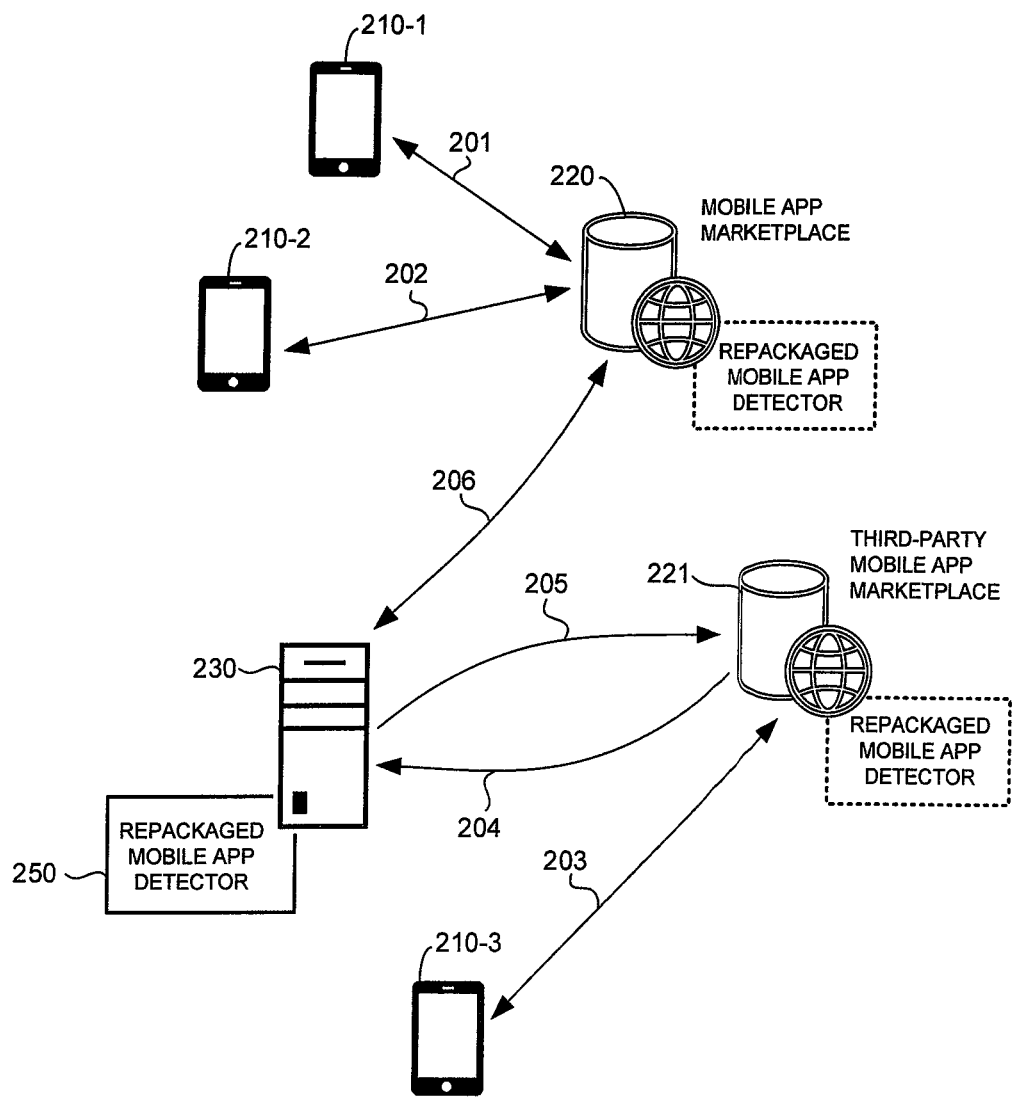
FIG. 2 shows a schematic diagram of a system in accordance with an embodiment of the present invention.

FIG. 2 shows a schematic diagram of a system in accordance with an embodiment of the present invention. In the example of FIG. 2, the system includes a plurality of mobile computing devices 210 (i.e., 210-1, 210-2, 210-3), one or more mobile app marketplaces (i.e., 220, 221), and a computer system 230 for detecting repackaged mobile apps. The just mentioned components may communicate over the Internet or some other communication network. For example, the computer system 230 may receive mobile apps from the mobile app marketplaces 220 and 221 over the Internet.

A mobile computing device 210 may comprise a smartphone, tablet, or other mobile computing device that runs a mobile operating system. In the following embodiments, a mobile computing device 210 may comprise an ANDROID smartphone or tablet, i.e., a mobile computing device that runs the ANDROID operating system. Accordingly, in the example of FIG. 2, the mobile app marketplaces 220 and 221 comprise one or more computers that host ANDROID mobile apps for online purchase. The mobile app marketplace 220 may be the GOOGLE PLAY marketplace. The third-party mobile app marketplace 221 is a "third-party" in that it is not maintained and operated by GOOGLE Inc., which is the vendor of the ANDROID operating system. As can be appreciated, embodiments of the present invention may also be applied to other mobile computing devices, mobile apps, and mobile operating systems.

A mobile computing device 210, such as the mobile computing devices 210-1 and 210-2 shown in FIG. 2, may connect to and receive a mobile app from the mobile app marketplace 220, which is also referred to as the "official mobile app marketplace" because it is maintained and operated by the vendor of the mobile operating system (see arrows 201 and 202). However, a mobile computing device 210, such as the mobile computing device 210-3, may also connect to and receive a mobile app from the third-party mobile app marketplace 221. While it is generally perceived that purchasing mobile apps from the official mobile app marketplace is safer, an increasing number of users choose to purchase mobile apps from a third-party mobile app marketplace for several reasons including variety of selection and low or zero cost (e.g., free "app of the day").

A problem that plagues mobile app marketplaces is the threat of malicious or infected mobile apps being made available for download from the marketplace. For example, a cybercriminal may unpack a mobile app and then repackage the mobile app to include malware. In the case of ANDROID mobile apps, the cybercriminal may repackage an ANDROID mobile app by unpacking an authentic (i.e., as published by its original publisher) APK file to reveal its files, replacing or infecting at least of the files with malware, repackaging the APK file, and then making the repackaged APK file available for download from the marketplace. This is especially problematic when the repackaged mobile app is a well-known mobile app: users would assume that the repackaged mobile app is authentic (and not an altered version) and consequently download the repackaged mobile app.

A mobile app is referred to by its name, which is also known as an "app label." One way of detecting a repackaged mobile app is by comparing its app label against the app label of the authentic version using exact string matching. However, exact string matching may lead to high rates of false positives (i.e., deeming a mobile app to be repackaged when it is not) or false negatives (i.e., deeming a mobile app to be authentic when it is actually repackaged) because of the numerous of ways that an app label may be represented. This is especially problematic when the app label is in a non-English language that does not use the Latin alphabet, e.g., Chinese or Japanese app labels.

A computer system 230 may comprise one or more computers for detecting repackaged mobile apps. In the example of FIG. 2, the computer system 230 comprises a repackaged mobile app detector 250. In one embodiment, the repackaged mobile app detector 250 is implemented in software, i.e., computer-readable program code. As can be appreciated, the repackaged mobile app detector 250 may also be implemented in hardware (e.g., logic circuits) or combination of hardware and software (e.g., hardware components with software drivers).

As its name implies, the repackaged mobile app detector 250 detects repackaged mobile apps. Generally speaking, a repackaged mobile app is a mobile app that has been unpacked to reveal its original components and then repackaged back together again. In terms of the ANDROID operating system, a repackaged ANDROID mobile app comprises an APK file that has been unpacked to extract the files originally contained therein and then repackaged. The repackaged ANDROID mobile app may include original files from the APK file (i.e., files that are in the APK file before the unpacking), a new file, and/or a modified original file.

In the present disclosure, a mobile app that is being evaluated is also referred to as a "target mobile app" and an authentic mobile app is "a reference mobile app." A reference mobile app is thus known to be in the same state as originally published by its publisher. Generally speaking, the repackaged mobile app detector 250 determines whether or not a target mobile app is a repackaged version of a reference mobile app. In one embodiment, the repackaged mobile app detector 250 determines whether or not a target mobile app has been repackaged by determining the similarity of the app label of the target mobile app to the app label of a reference mobile app. The similarity of app labels may be in terms of sound (i.e., sound when the app label is pronounced) and appearance (i.e., how the app label looks like).

To detect a repackaged mobile app, the repackaged mobile app detector 250 may also compare an identifier of a target mobile app to an identifier of a reference mobile app. In one embodiment, the identifier of a mobile app identifies the publisher of the mobile app. For ANDROID mobile apps, the identifier may be the public key of the publisher (also referred to as the "developer") of the ANDROID mobile app, which is included in the mobile app for licensing purposes In one embodiment, the repackaged mobile app detector 250 deems a target mobile app to be a repackaged mobile app when the target and reference mobile apps have similar app labels (including the same app labels) but have different identifiers.

In the example of FIG. 2, the computer system 230 may receive mobile apps from the third-party mobile app marketplace 221 for evaluation (see arrow 204). The computer system 230 determines whether or not any of the received mobile apps has been repackaged, e.g., by using the repackaged mobile app detector 250. The computer system 230 may provide the evaluation results to the third-party mobile app marketplace 221 (see arrow 205). This allows the third-party mobile app marketplace 221 to remove repackaged mobile apps that have been identified by the computer system 230. The computer system 230 may also provide the same repackaged mobile app detection service to other mobile app marketplaces, such as the mobile app marketplace 220 (see arrow 206).

The functionality of the computer system 230 may also be integrated with a mobile app marketplace. For example, the mobile app marketplaces 220 and 221 may each have its own repackaged mobile app detector for detecting repackaged mobile apps.

Figure 3:
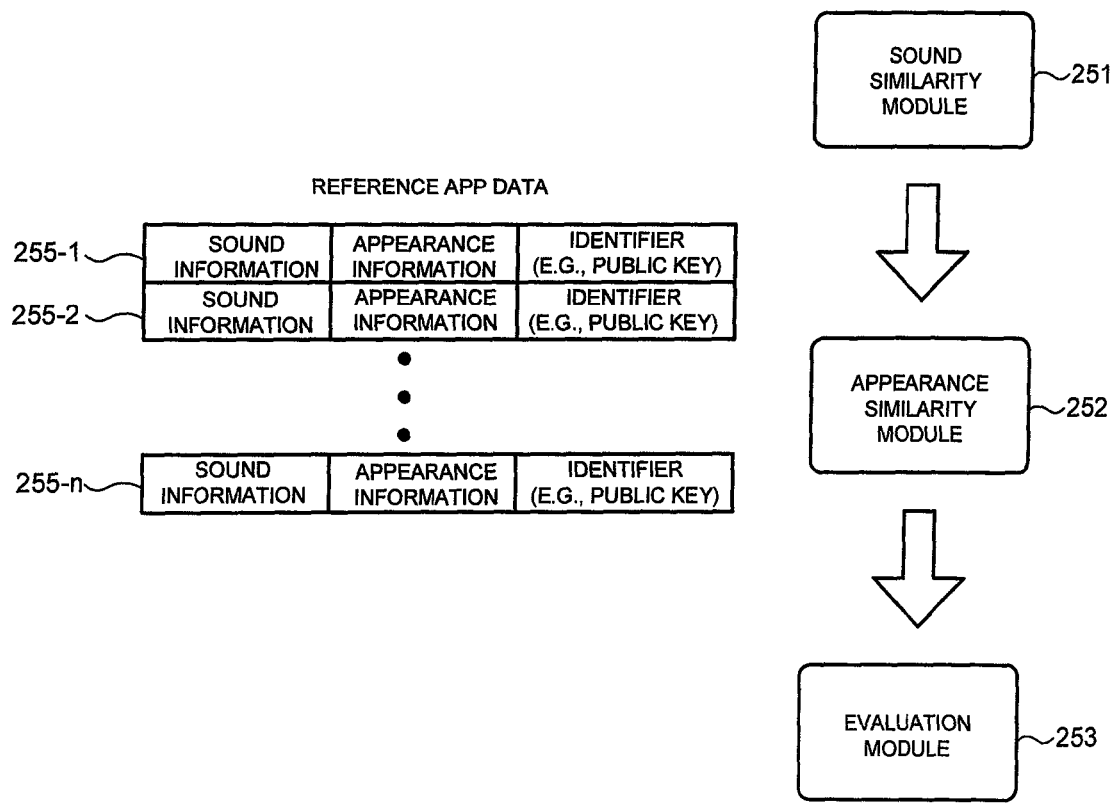
FIG. 3 shows a schematic diagram of a repackaged mobile app detector in accordance with an embodiment of the present invention.

FIG. 3 shows a schematic diagram of a repackaged mobile app detector 250 in accordance with an embodiment of the present invention. In the example of FIG. 3, the repackaged mobile app detector 250 comprises a sound similarity module 251, an appearance similarity module 252, an evaluation module 253, and reference mobile app data 255 (i.e., 255-1, 255-2, . . . , 255-n). In one embodiment, a sound similarity module 251, an appearance similarity module 252, and reference mobile app data 255 are designed for a particular language. For example, the repackaged mobile app detector 250 may include a sound similarity module 251, appearance similarity module 252, and reference mobile app data 255 for English app labels, and a separate sound similarity module 251, appearance similarity module 252, and reference mobile app data 255 for Chinese app labels. The sound similarity module 251 and the appearance similarity module 252 may be sub-modules of an app label similarity module (e.g., see FIG. 8, app label similarity module 281).

An app label may be evaluated by the sound similarity module 251 and the appearance similarity module 252 in no particular order. For example, the sound similarity module 251 and the appearance similarity module 252 may evaluate an app label in parallel, first by the sound similarity module 251 and then by the appearance similarity module 252, or first by the appearance similarity module 252 and then by the sound similarity module 251.

Reference mobile app data 255 may comprise data regarding reference mobile apps, i.e., data regarding known, authentic mobile apps. Typically, the reference mobile app data 255 comprise data for popular mobile apps, such as PLANTS VS ZOMBIES mobile app, ANGRY BIRDS mobile app, etc. In the example of FIG. 3, reference mobile app data 255 may comprise sound information, appearance information, and identifier for a particular reference mobile app. The sound information includes information on the sound of the app label of the reference mobile app, i.e., how the app label of the reference mobile app sounds when pronounced. For an app label in the English language, the sound information may be the representation of the app label using the soundex phonetic algorithm.

In one embodiment, for a non-English language that does not use the Latin alphabet, the sound information indicates the pronunciation of the app label in the non-English language as represented using the Latin alphabet. This may involve converting the app label to its Latin alphabet representation. As a particular example, for an app label that is written in Chinese characters, the sound information may comprise the Pinyin representation of the app label. As is well known, Pinyin is the transcription of Mandarin pronunciations in the Latin alphabet. Similarly, for an app label that is written in Japanese characters, the sound information may comprise the Romaji representation of the app label.

The appearance information indicates how the text of the app label looks like. The appearance information may be in the Latin alphabet for app labels written in the English language, in Chinese characters for app labels written in the Chinese language, etc. in one embodiment, the appearance information is an image, i.e. pictorial, representation of the app label.

The identifier may comprise the identifier of the reference mobile app, and is typically not language dependent. In the case of ANDROID reference mobile apps, the identifier may be the public key of the publisher of the ANDROID reference mobile app, for example.

The sound similarity module 251 determines the similarity of the sounds of app labels of target and reference mobile apps. Generally speaking "sound similarity" is a measure of the closeness of a pronunciation of an app label of a target mobile app to a pronunciation of an app label of a reference mobile app. The sound similarity module 251 may receive an app label of a target mobile app and compare the sound of the app label of the target mobile app with the sound of an app label of a reference mobile app. The sound similarity module 251 may consult the reference mobile app data 255 for sound information of reference mobile apps. For app labels that are written in the English language, the sound similarity module 251 may employ the Soundex phonetic algorithm to determine the similarity of the sounds of app labels of target and reference mobile apps. Other suitable algorithms for determining sound similarity may also be employed without detracting from the merits of the present invention. The sound similarity module 251 may generate a similarity score that is indicative of sound similarity.

In one embodiment, for app labels that are not written in the English language, the sound similarity module 251 generates the Latin alphabet representation of the app label of the target mobile app, determines the Latin alphabet representation of the app label of the reference mobile app (e.g., by consulting the reference mobile app data 255), and determines the similarity of the Latin alphabet representations of the app labels of the target and reference mobile apps. The similarity of the Latin alphabet representations of the app labels of the target and reference mobile apps may be calculated using the edit distance algorithm, for example. App labels may be converted to their Latin alphabet representations using conventional converter algorithms, e.g., a Chinese character to Pinyin converter, Japanese character to Romaji converter, etc., without detracting from the merits of the present invention.

As a particular example, for app labels that are written in the Chinese language, the sound similarity module may convert the app label of the target mobile app into Pinyin and compare the similarity of the Pinyin representation of the app label of the target mobile app with the Pinyin representation of the app label of the reference mobile app. As another example, for app labels that are written in the Japanese language, the sound similarity module may convert the app label of the target mobile app into Romaji and compare the similarity of the Romaji representation of the app label of the target mobile app with the Romaji representation of the app label of the reference mobile app. The similarity of Pinyin or Romaji representations of app labels may be calculated using the edit distance algorithm or other suitable similarity algorithms. The Pinyin or other Latin alphabet representations of app labels may be weighted to give more or less importance to particular initial or final tones.

The appearance similarity module 252 determines the similarity of the appearance of an app label of a target mobile app to the appearance of an app label of a reference mobile app. Generally speaking "appearance similarity" is a measure of how much an app label of a target mobile app looks like an app label of a reference mobile app. Appearance similarity may be based on how close an image of the app label of the target mobile app is to an image of the reference mobile app. More specifically, in one embodiment, the appearance similarity module 252 converts the app label of the target mobile app into an image and compares the image of the app label of the target mobile app with the image of the app label of the reference mobile app (e.g., by consulting the reference mobile app data 255). For example, the appearance similarity module 252 may employ the image comparison algorithm of Table 1 to calculate the similarity of images of app labels of the target and reference mobile apps.

TABLE 1

| | |
|---|---|
| 1. | Resize Icons to 64 × 64 px |
| 2. | Map Colors to Low-dimensional Space |
| 3. | Calculate Image Similarity Hash |

Other suitable image comparison algorithms may also be employed without detracting from the merits of the present invention. The appearance similarity module 252 may generate an appearance similarity score indicative of the similarity between the appearances of the app labels of the target and reference mobile apps.

Figure 4:
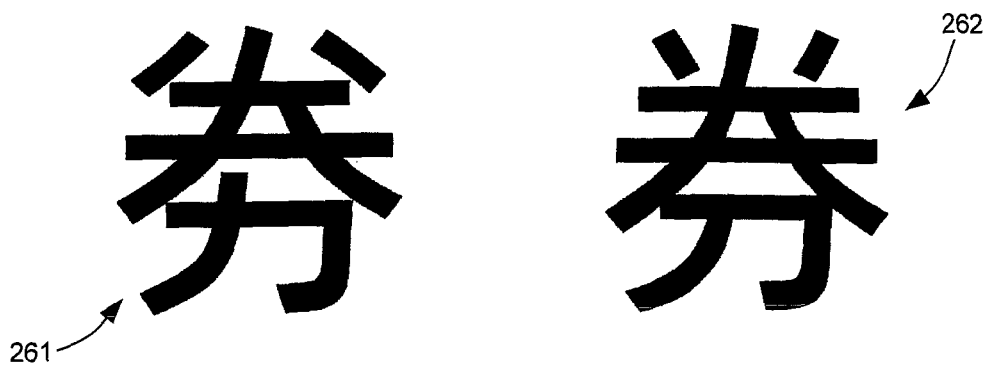
FIG. 4 shows example Chinese characters that may appear in app labels.

Determining the appearance similarity of app labels of target and reference mobile apps is particularly important when the app labels are not in the Latin alphabet. For example, FIG. 4 shows example Chinese characters 261 and 262 that may appear in Chinese app labels. Although the Chinese characters 261 and 262 appear to be the same, closer inspection reveals that they are actually different in subtle ways, making it difficult for a user to manually detect the difference. For English app labels, converting ASCII characters to images and comparing the images allows for detection of similar characters like "o", "O", "0" and "l", "1", "I". As can be appreciated, a computer has no optical biases, allowing it to perform a more objective image comparison.

FIGS. 5-7 show example ways of how an app label of a repackaged mobile app may be varied but remain similar to the authentic, i.e., reference, mobile app. In the example of FIG. 5, the app label 290 is the app label of a reference mobile app. The app labels below the app label 290 are subtly modified versions of the app label 290. Notice the change in spacing, capitalization, and spelling variations.

In FIG. 6, the app label 291 is the app label of a reference mobile app. The app label 291 is in the Chinese language with Chinese characters. The app labels below the app label 291 are subtly modified versions of the app label 291. Notice the replacement of a Chinese character in the modified app label (see dotted circle 292).

In FIG. 7, the app label 293 is the app label of a reference mobile app. The app label 293 is in the Chinese language with Chinese characters. The app labels below the app label 293 are subtly modified versions of the app label 291. Notice the modification of a Chinese character in the modified app label (compare the Chinese characters in dotted circles 294 and 295).

A cybercriminal may slightly vary an app label of a repackaged mobile app so that an exact string matching algorithm will have difficulty finding the repackaged mobile app. Advantageously, the repackaged mobile app detector 250 can still detect these repackaged mobile apps.

Referring back to FIG. 3, the evaluation module 253 may receive comparison results from the sound similarity module 251 and the appearance similarity module 252 and, based on the comparison results, determine the overall similarity of app labels of target and reference mobile apps. For example, the evaluation module 253 may receive a sound similarity score from the sound similarity module 251 and an appearance similarity score from the appearance similarity module 252. The evaluation module 253 may compare these similarity scores to a threshold to determine whether or not the app label of the target mobile app is similar to the app label of the reference mobile app. More specifically, the evaluation module 253 may deem an app label of the target mobile app to be similar to an app label of a reference mobile app when the sound and appearance similarity scores are equal to or greater than a similarity threshold. As can be appreciated, the app label of the target mobile app will be at least similar to the app label of the reference mobile app when the two app labels are exactly the same.

The evaluation module 253 may also parse the target mobile app to obtain its identifier and compare the identifier of the target mobile app to the identifier of the reference mobile app (e.g., by consulting the reference mobile app data 255). That is, the evaluation module 253 may determine if the target and reference mobile apps have the same identifier. When the target and reference mobile apps have different identifiers but the app labels of the target and reference mobile apps are deemed by the evaluation module 253 to be similar, the evaluation module 253 may deem the target mobile app to be a repackaged mobile app.

Figure 8:
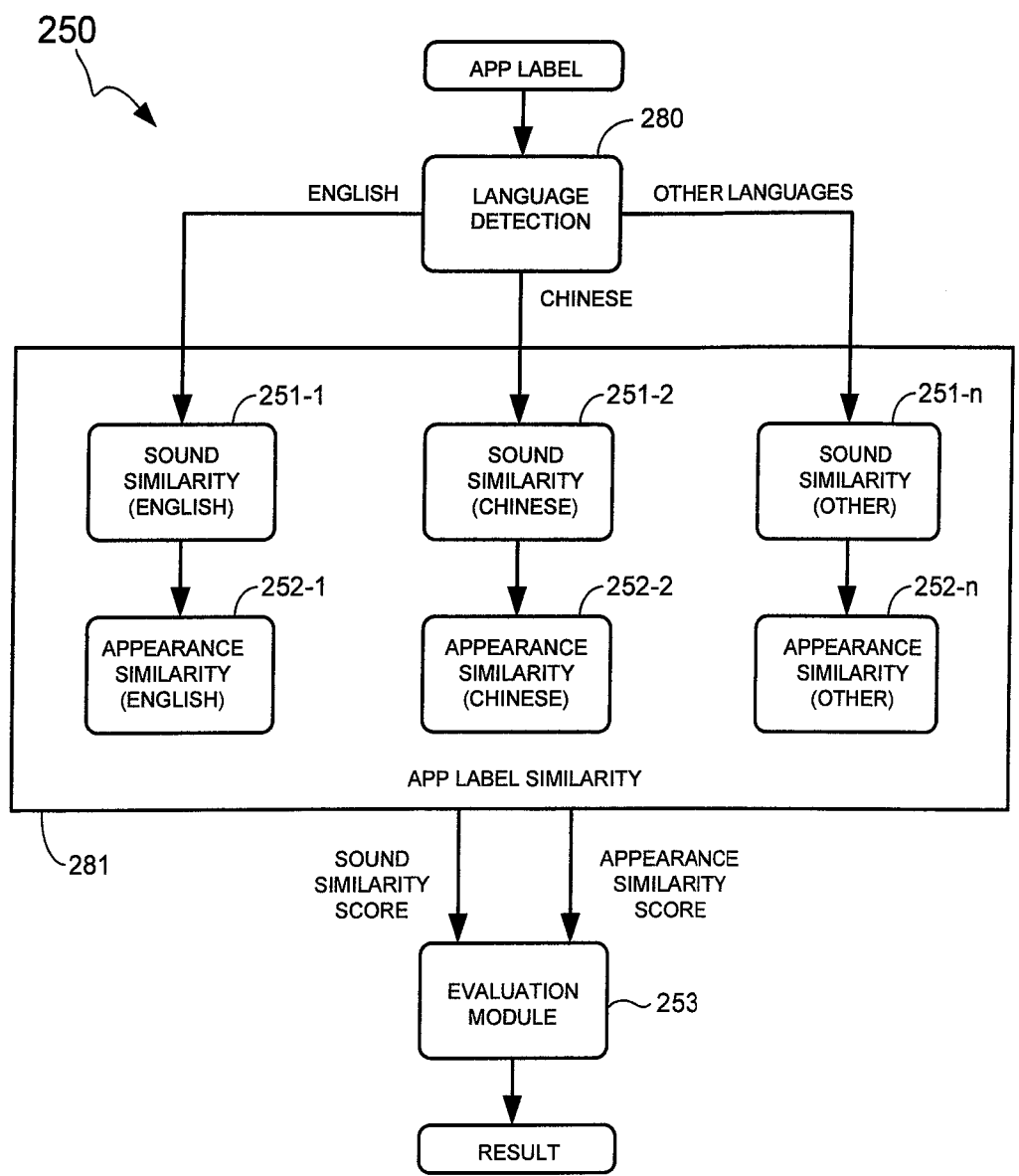
FIG. 8 shows a schematic diagram of a repackaged mobile app detector in accordance with an embodiment of the present invention.

FIG. 8 shows a schematic diagram of a repackaged mobile app detector 250 in accordance with an embodiment of the present invention. In the example of FIG. 8, the repackaged mobile app detector 250 includes a language detection module 280, an app label similarity module 281, and the previously described evaluation module 253. In one embodiment, the app label similarity module 281 includes previously-described sound similarity modules 251 (i.e., 251-1, 251-2, . . . , 251-n) and appearance similarity modules 252 (i.e., 252-1, 252-2, . . . , 252-n). A sound similarity module 251 and an appearance similarity module 252 may be provided for a particular language. In the example of FIG. 8, the sound similarity module 251-1 and the appearance similarity module 252-1 are for evaluating English app labels, the sound similarity module 251-2 and the appearance similarity module 252-2 are for evaluating Chinese app labels, and so on.

The language detection module 280 receives an app label of a target mobile app to determine the language the app label is written. The language detection module 280 may compare characters and/or alphabets of the app label to dictionaries, database of characters and alphabets, etc. to detect the language of the app label. The language detection module 280 may forward an English app label to the sound similarity module 251-1 and the appearance similarity module 252-1, a Chinese app label to the sound similarity module 251-2 and appearance similarity module 252-2, etc.

In the case of an English app label being evaluated, the sound similarity module 251-1 and the appearance similarity module 252-1 may compare the app label to an English app label of an English reference mobile app to generate a sound similarity score and an appearance similarity score, respectively. Similarly, in the case of a Chinese app label being evaluated, the sound similarity module 251-2 and the appearance similarity module 252-2 may compare the app label to a Chinese app label of a Chinese reference mobile app to generate a sound similarity score and an appearance similarity score, respectively. The evaluation module 253 may determine the overall similarity of the app label of the target mobile app based on corresponding sound and similarity scores.

The evaluation module 253 may deem the target mobile app to be a repackaged mobile app when the evaluation module 253 deems the target mobile app and at least one reference mobile app to have similar app labels but the target mobile app and the at least one reference mobile app have different identifiers. In the particular case of evaluating a target ANDROID mobile app, the evaluation module 253 may deem the target ANDROID mobile app to be a repackaged mobile app when the target ANDROID mobile app and at least one reference ANDROID mobile app have similar app labels but the target and reference ANDROID mobile apps have different public keys. The evaluation module 253 may output a positive evaluation result when it deems the target mobile app to be a repackaged mobile app; otherwise, the evaluation module 253 may output a negative result.

Figure 9:
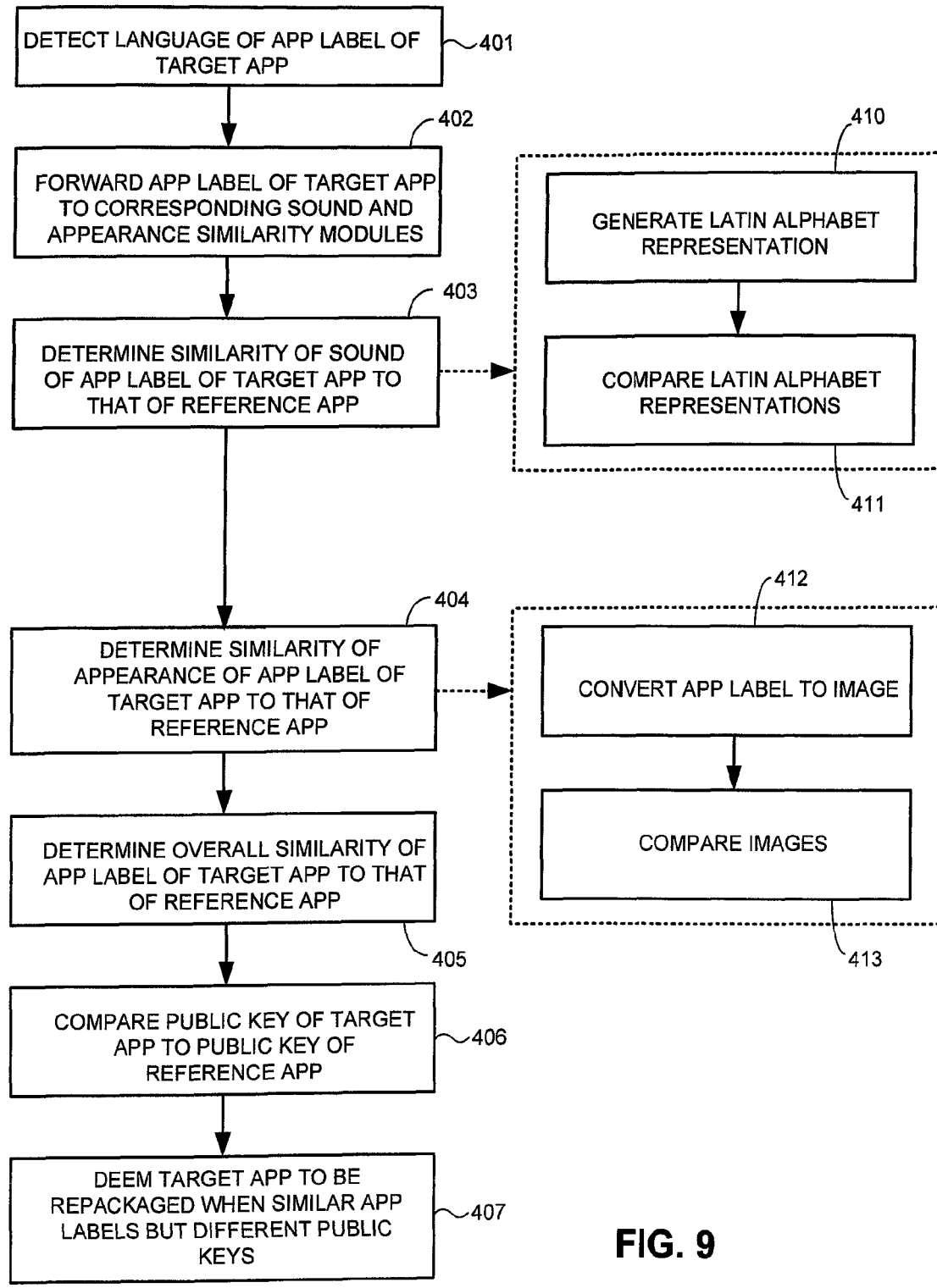
FIG. 9 shows a flow diagram of a method of detecting a repackaged mobile app in accordance with an embodiment of the present invention.

FIG. 9 shows a flow diagram of a method of detecting a repackaged mobile app in accordance with an embodiment of the present invention. The method of FIG. 9 may be performed by the computer system 230 to determine whether or not an ANDROID mobile app is a repackaged mobile app. As can be appreciated, the method of FIG. 9 may also be performed using other components to evaluate other types of mobile apps.

In the method of FIG. 9, the language of an app label of a target ANDROID mobile app is detected (step 401). The app label of the target ANDROID mobile app is forwarded to the sound and appearance similarity modules for the language of the app label (step 402). The sound of the app label of the target ANDROID mobile app is compared to the sound of an app label of a reference ANDROID mobile app to determine their similarity (step 403). A sound similarity score indicative of the similarity of the sound of the app label of the target ANDROID mobile app to the sound of the app label of the reference ANDROID mobile app may be generated.

In the case of an English app label, the sounds of app labels of the target and reference ANDROID mobile apps may be directly compared using a suitable phonetic comparison algorithm. In the case of a non-English app label, a Latin alphabet representation of the app label of the target ANDROID mobile app is generated (step 410). The Latin alphabet representation of the app label of the target ANDROID mobile app is then compared to the Latin alphabet representation of the app label of the reference ANDROID mobile app to determine the similarity of the Latin alphabet representations (step 411). For example, when the app label of the target ANDROID mobile app is in Chinese, the Pinyin representation of the app label of the target ANDROID mobile app may be compared to the Pinyin representation of the app label of the reference ANDROID mobile app. As another example, when the app label of the target ANDROID mobile app is in Japanese, the Romaji representation of the app label of the target ANDROID mobile app may be compared to the Romaji representation of the app label of the reference ANDROID mobile app.

The appearance of the app label of the target ANDROID mobile app is compared to the appearance of the app label of the reference ANDROID mobile app to determine the similarity of the appearance of the app label of the target ANDROID mobile app to the appearance of the app label of the reference ANDROID mobile app (step 404). For example, the app label of the target ANDROID mobile app may be converted into an image (step 412), which is then compared to the image of the app label of the reference ANDROID mobile app to determine their similarity (step 413). An appearance similarity score indicative of the similarity of the appearance of the app label of the target ANDROID mobile app to the appearance of the app label of the reference ANDROID mobile app may be generated.

The overall similarity of the app label of the target ANDROID mobile app to the app label of the reference ANDROID mobile app is determined based on the similarity of the sound and appearance of the app label of the target ANDROID mobile app to the sound and appearance of the app label of the reference ANDROID mobile app (step 405). For example, the app labels of the target and reference ANDROID mobile apps may be deemed to be similar when the sound and appearance similarity scores obtained by comparing the app labels meet or exceed a standard, such as a similarity threshold. As can be appreciated, app labels may also be deemed to be similar when they are exactly the same because the corresponding similarity scores will be at or near the maximum possible values.

The target ANDROID mobile app is parsed to obtain its public key, which is then compared to the public key of the reference ANDROID mobile app (step 406). The target ANDROID mobile app is deemed to be a repackaged mobile app when the app labels of the target and reference ANDROID mobile apps are deemed to be similar but the target and reference ANDROID mobile apps have different public keys.

Methods and systems for detecting repackaged mobile apps have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method comprising:
    receiving, in a computer system, a target mobile app that has been obtained from a third-party mobile app marketplace, the target mobile app being an application program for a mobile computing device that runs a mobile operating system;
    generating a sound similarity score by comparing a pronunciation of an app label of the target mobile app to a pronunciation of an app label of a reference mobile app, the sound similarity score being indicative of similarity of the pronunciation of the app label of the target mobile app to the pronunciation of the app label of the reference mobile app;
    determining a similarity of the app label of the target mobile app to the app label of the reference mobile app by comparing the sound similarity score to a threshold and by comparing an appearance of the app label of the target mobile app to an appearance of the app label of the reference mobile app, wherein comparing the appearance of the app label of the target mobile app to the appearance of the app label of the reference mobile app comprises converting the app label of the target mobile app into an image and comparing the image of the app label of the target mobile app to an image of the app label of the reference mobile app; and
    determining that the target mobile app is a repackaged version of the reference mobile app when the app labels of the target and reference mobile apps are similar but the target and reference mobile apps have different public keys.

2. A system comprising:
    a computer system comprising a memory and a processor, wherein the memory comprises instructions that when executed by the processor causes the computer system to:

receive a target mobile app for a mobile computing device that runs a mobile operating system, generate a sound similarity score by comparing a pronunciation of an app label of the target mobile app to a pronunciation of an app label of a reference mobile app, determine similarity of the pronunciation of the app label of the target mobile app to the pronunciation of the app label of the reference mobile app by comparing the sound similarity score to a threshold, determine a similarity of an appearance of the app label of the target mobile app to an appearance of the app label of the reference mobile app by converting the app label of the target mobile app into an image and comparing the image of the app label of the target mobile app to an image of the app label of the reference mobile app, and determine that the target mobile app is a repackaged version of the reference mobile app when the app labels of the target and reference mobile apps are determined to be similar in pronunciation and appearance but the target and reference mobile apps have different public keys, wherein the target mobile app has been obtained from a third-party mobile app marketplace and the sound similarity score is indicative of similarity of the pronunciation of the app label of the target mobile app to the pronunciation of the app label of the reference mobile app.

3. A computer-implemented method comprising:

receiving a target mobile app in a computer system, the target mobile app having been obtained from a third-party mobile app market place;

generating a sound similarity score by comparing a pronunciation of an app label of the target mobile app to a pronunciation of an app label of a reference mobile app;

generating an appearance similarity score by comparing an appearance of the app label of the target mobile app to an appearance of the reference mobile app by converting the app label of the target mobile app into an image and comparing the image of the app label of the target mobile app to an image of the app label of the reference mobile app;

determining overall similarity of the app label of the target mobile app to the app label of the reference mobile app by comparing the sound similarity score and the appearance similarity score to a threshold; and determining that the target mobile app is a repackaged version of the reference mobile app when the app labels of the target and reference mobile apps are determined to be similar in pronunciation and appearance but the target and reference mobile apps have different public keys.

\* \* \* \* \*